F. C. RANDALL.
FRUIT WASHER.
APPLICATION FILED SEPT. 3, 1915.
1,161,727.
Patented Nov. 23, 1915.
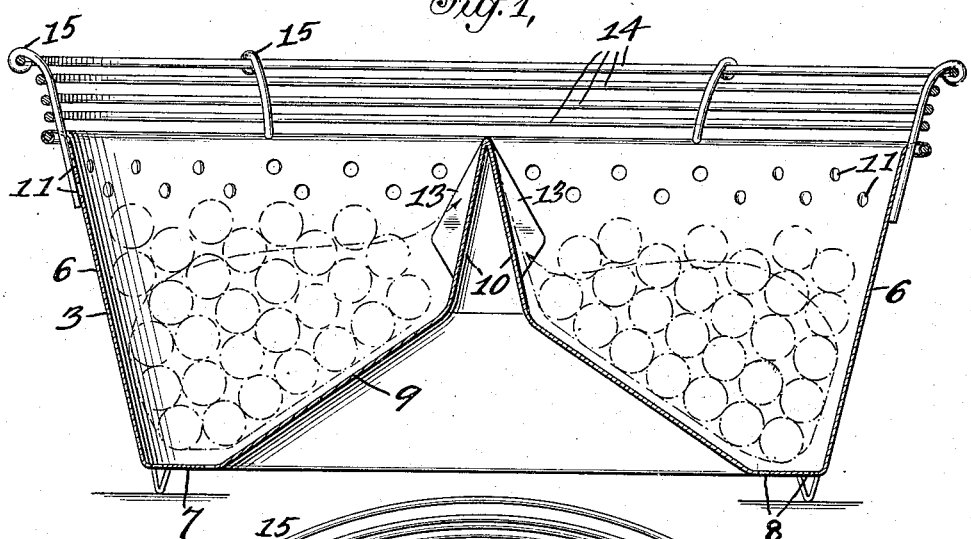
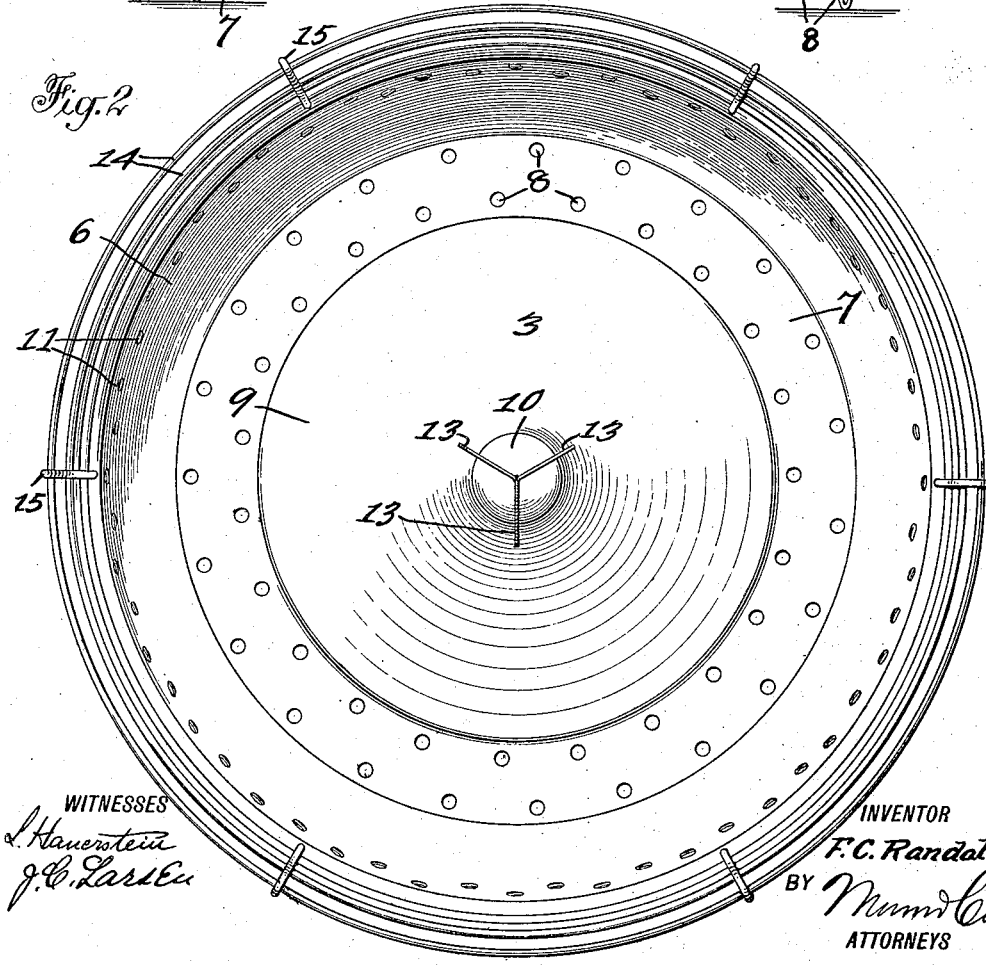
WITNESSES
INVENTOR
F. C. Randall
BY
ATTORNEYS

UNITED STATES PATENT OFFICE.

FRANK CALVIN RANDALL, OF BENTON HARBOR, MICHIGAN.

FRUIT-WASHER.

1,161,727.   Specification of Letters Patent.   Patented Nov. 23, 1915.

Application filed September 3, 1915.   Serial No. 48,812.

*To all whom it may concern:*

Be it known that I, FRANK C. RANDALL, a citizen of the United States, and a resident of Benton Harbor, in the county of Berrien and State of Michigan, have invented certain new and useful Improvements in Fruit-Washers, of which the following is a specification.

My invention relates to the washing of fruits, vegetables, etc., and the main object thereof is to provide a device of this class wherein the articles being washed are caused to revolve in a flow of water to present all portions of their surfaces to the flow or force of the water whereby they will be thoroughly cleansed of all foreign matter, and a further object thereof is to provide means for confining the articles within the washer in the event of too great force of water being introduced into said washer and which means also serve to permit the escape of waste matter of too great a size to escape in the normal manner.

My invention is fully described in the following specification, of which the accompanying drawings form a part, in which like characters refer to like parts in each of the views, and in which:—

Figure 1 is a central vertical section taken through a washer constructed in accordance with my invention, with the articles to be washed and the lines of water flow indicated by dotted lines; and Fig. 2 is a top plan view of the washer.

In the drawings forming a part of this application I have shown a pan shaped receptacle 3 composed of inclined side walls 6, and a bottom formed of a horizontal portion 7 perforated at 8 and a conical portion 9 surmounted by a dome 10, both the conical portion 9 and the dome 10 being imperforate, but I provide perforations 11 through the side walls 6 adjacent the top thereof. The dome 10 extends to the level of the top of the receptacle 3 in the form shown and is provided with a plurality of radial fins 13 which operate to form distinct streams of the water introduced into the washer under pressure directly over the dome, though these streams merge after they reach the bottom of the washer. I also provide a cage around the top of the washer formed of horizontal wires 14 and outwardly flared standards 15, these permitting the escape of water under too great pressure without permitting any of the articles being washed to be carried thereover, and I also provide short legs 16 in order to permit free passage of water through the perforations 8.

As indicated by the dotted lines in Fig. 1, the water flows down the sides of the dome and over the conical bottom 9 beneath the articles to be washed indicated by dotted circles, thence swirling upwardly and inwardly toward the dome, thereby raising the articles slightly from the bottom and causing them to roll one over the other to present their entire surfaces to the water and to frictionally engage each other to remove all foreign matter on the surfaces thereof. The heavier foreign matter may escape through the perforations 8 and the lighter matter will be carried upwardly and outwardly of the washer through the perforations 11, as the perforations 8 are not sufficient to draw off the water in the degree of water admission, and, should one row of the perforations 11 become clogged, the matter may flow out through a higher row or over the top of the washer. If the pressure should be too great or the articles to be washed of less specific gravity than others to be washed whereby they are carried to the top of the washer, the cage formed by the wires 14 and 15 will prevent the escape of said articles from the washer as the water level can never reach to the top of said cage.

My invention is very simple though highly efficient, and may be set in any convenient or suitable place, either beneath a faucet or beneath a section of hose led to the washer, and, while I have shown a present preferred form of construction, I do not limit myself thereto but may make changes thereover, within the scope of the following claims, without departing from the spirit of my invention or sacrificing its advantages.

Having fully described my invention, what I claim as new, and desire to secure by Letters Patent, is:—

1. A device of the class described, comprising a receptacle formed of side walls perforated adjacent the top thereof, a perforated horizontal bottom member, an imperforate conical bottom member, and an imperforate dome carried by said conical member.

2. A device of the class described, comprising a receptacle formed of side walls perforated adjacent the top thereof, a perforated horizontal bottom member, an imperforate conical bottom member, and an imperforate dome carried by said conical member, said dome being of greater pitch than said conical member.

3. A device of the class described, comprising a receptacle formed of side walls perforated adjacent the top thereof, a perforated horizontal bottom member, an imperforate conical member, an imperforate dome carried by said conical member, and a plurality of radial fins carried by said dome.

4. A device of the class described, comprising a receptacle formed of side walls perforated adjacent the top, a perforated bottom member, an imperforate conical bottom member, an imperforate dome on said conical member, and a cage carried by said side walls formed of horizontal spaced wires and wire standards.

In testimony whereof I have signed my name to this specification in the presence of two subscribing witnesses.

FRANK CALVIN RANDALL.

Witnesses:
W. P. HARVEY,
BLENDA A. SEABURG.

Copies of this patent may be obtained for five cents each, by addressing the "Commissioner of Patents, Washington, D. C."